Dec. 21, 1948.  W. C. CHOWNS  2,456,676
SLIDE INDICATOR RULE
Filed Feb. 21, 1947
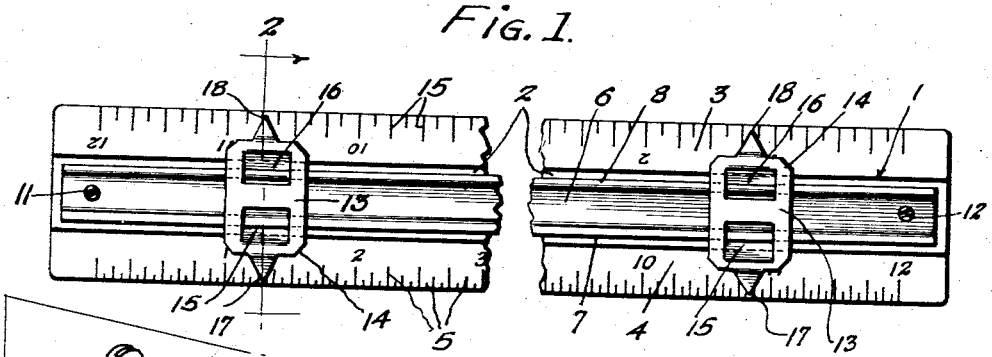
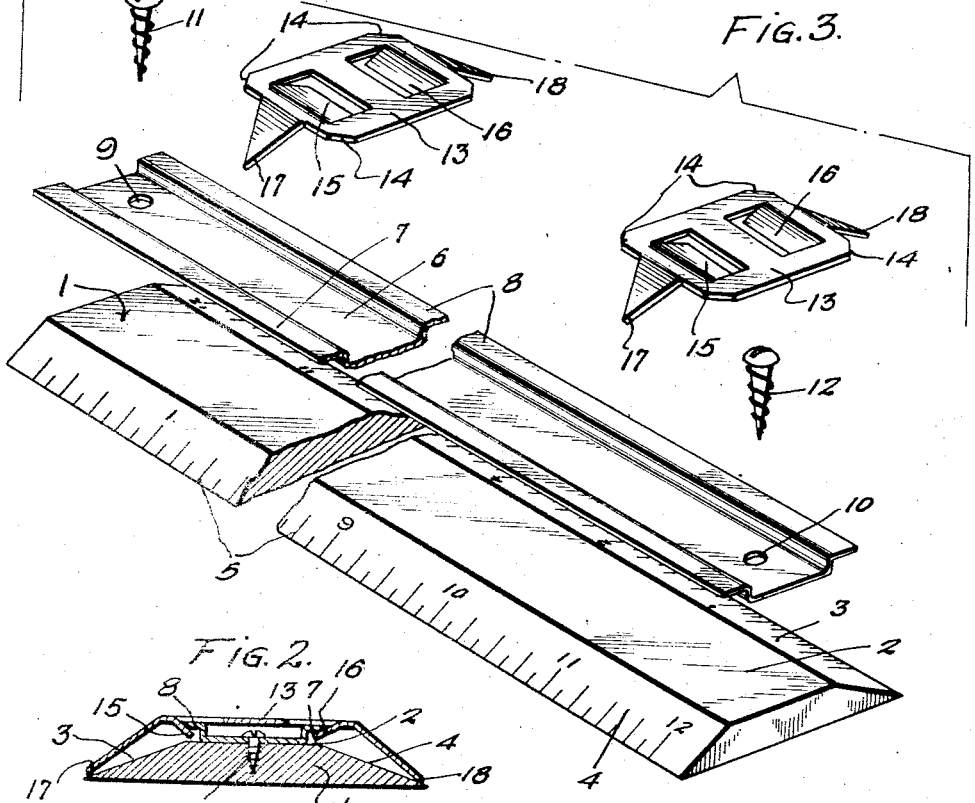
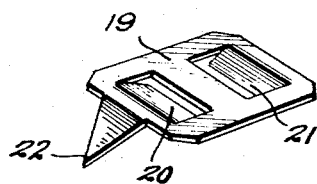
Inventor
WILLIAM C. CHOWNS
By Donald L. Mayson.

Patented Dec. 21, 1948

2,456,676

UNITED STATES PATENT OFFICE 2,456,676

SLIDE INDICATOR RULE

William C. Chowns, East Detroit, Mich.

Application February 21, 1947, Serial No. 730,003

5 Claims. (Cl. 33—107)

This invention relates to improvements in slidable indicators for rules and other types of straight edge measuring implements.

An object of the invention is to provide an improved slidable indicator for rules and straight edge implements which will include a guide track and a slidable indicator which may be readily attached at a moment's notice to any type of rule or straight edge measuring implement.

Another object of the invention is to provide an improved detachable guide track and associated interlocking slidable indicator for securing to the upper surface of a common type rule or any other type of straight edge measuring implement having scale indicia on one edge or both edges thereof.

Another object of the invention is to provide an improved accessory for a common type desk rule or for any other type of straight edge measuring implement which will include a substantially U-shape trackway having oppositely extending locking flanges formed integrally therewith and a one-piece slide indicator adapted to cooperate therewith having oppositely disposed locking ears struck from the body of the marker adapted to be received beneath the oppositely extending locking flanges for guiding the indicator as it is slidably adjusted longitudinally of and on said trackway.

A further object of the invention is to provide an improved detachably positioned U-shape guide trackway and an associated one-piece indicator slidably disposed thereon, whereby said device may be secured by screwing to the upper surface of a common type ruler or other measuring device for measuring and recording the measurements which have been made by said rule and indicator.

Another object of the invention is to provide an improved combination detachable guide trackway and associated slide indicator which will be detachably secured to the upper surface of any desired type of rule or straight edge measuring implement, said device being highly efficient in operation and relatively inexpensive to manufacture and produce.

Other objects will appear as the description proceeds.

In the accompanying drawings which form a part of this application,

Figure 1 is a plan view of a rule with the improved guide trackway and a pair of indicators slidably positioned thereon;

Figure 2 is a sectional view taken on the line 2—2 of Figure 1;

Figure 3 is an exploded view of a rule with the guide trackway and associated indicators and attaching screws, and Figure 4 is a perspective view of a slightly modified form of indicator formed with a single pointer.

Like characters of reference are used throughout the following specification and the accompanying drawings to designate corresponding parts.

In carrying out the invention, there is provided and illustrated a rule generally designated by the reference numeral 1 having a flat longitudinally extending upper central portion 2 and opposed angularly disposed scale indicia bearing edges 3 and 4 formed with the usual scale markings 5.

The subject matter of the improved invention comprises a U-shaped guide trackway 6 having oppositely extending bearing flanges 7 and 8. Apertures 9 and 10 will be formed through the opposite ends of the base portion of the guide trackway 6 for receiving the attaching screws 11 and 12 which will be screwed into the flat portion 2 of the rule 1 when the guide trackway 6 is attached to the rule.

Associated with the guide trackway 6 is one or more slide indicators formed in a similar manner from a flat piece of suitable material. Each indicator consists of a substantially rectangular body 13 which is bevelled off as at 14 at its four corners, and is formed with the opposite downwardly and inwardly extending locking ears 15 and 16, the same being struck from the body 13 and bent downwardly to engage beneath the oppositely extending bearing flanges 7 and 8 when the indicator is slid over one end of the guide trackway 6.

In the preferred form of slide indicator, a pair of oppositely extending pointers or markers 17 and 18 are formed integrally with the body 13 at the opposite ends thereof to overlie the rule scale indicia or markings 5, as clearly illustrated in Figure 1 of the drawings.

In Figure 4 of the drawings, there is shown a slight modification of the slide indicator which has a body portion 19 with oppositely extending bearing flanges 20 and 21, and a single point marker 22, made for a rule which is provided with scale markings on one edge only, the other construction or formation of the marker being identical with the form illustrated in Figure 3 of the drawings.

From the foregoing description, it will be apparent that there has been devised and provided an improved form of detachable guide trackway and slide indicator therefor, which may be readily and quickly secured to the upper surface of any type of rule or straight edge measuring implement, whereby accurate measurements may be made and recorded for any type of work requiring absolute accuracy in the taking of measurements.

While the preferred form of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a rule and a slide indicator therefor including a U-shaped guide trackway having opposed outwardly extending bearing flanges formed integrally therewith, means for detachably attaching said trackway to said rule in parallel relation to one edge thereof, and a metal slide indicator having inwardly depending resilient means struck therefrom engageable with the under surfaces of said bearing flanges and slidably mounting said indicator on said trackway.

2. In combination with a rule and a slide indicator therefor including a U-shape guide trackway detachably secured to said rule in parallel relation to one edge thereof and formed with oppositely extending bearing flanges, an indicator slidably disposed on said flanges having opposed inwardly and downwardly extending resilient flanges engageable with the under surfaces of said first mentioned bearing flanges on said trackway, and indicating pointers on said indicator.

3. In combination with a rule and a slide indicator therefor including an elongated U-shape guide trackway having laterally extending opposed side bearing edges, an indicator slidably supported on said trackway having opposed inwardly and downwardly extending integrally formed flexible guide bearing flanges engageable under said side bearing flanges, and a laterally extending pointer on said indicator.

4. In combination with a rule having a longitudinally extending upper flat edge and distance measuring indicia on an edge of said rule, an elongated U-shape guide channeled trackway having oppositely extending lateral bearing edges and means for attaching said trackway to said flat portion of the rule, sheet metal indicators slidably mounted on said trackway having oppositely extending inwardly and downwardly disposed bearing and locking flanges struck from said indicators engageable under said bearing edges, and oppositely disposed integrally formed angularly disposed pointers on said indicators disposed in cooperative relation with said distance measuring indicia.

5. In combination with a rule having scale markings on its opposite edges and a slide indicator therefor including a U-shape guide trackway having opposed outwardly extending bearing flanges formed therewith, means for detachably attaching said trackway to said rule in parallel relation to the edges thereof, a metal indicator slidably supported upon said trackway with oppositely disposed inwardly and downwardly extending resilient guide flanges struck therefrom for engagement with the under surfaces of said opposed outwardly extending bearing flanges on said guide trackway, and oppositely extending downwardly directed pointers formed integrally with said indicator for overlying the edge scale markings on said rule.

WILLIAM C. CHOWNS.

REFERENCES CITED

The following references are of record in the file of this patent:

UNITED STATES PATENTS

| Number | Name | Date |
| --- | --- | --- |
| 776,897 | Ferris | Dec. 6, 1904 |
| 1,110,195 | Erwin | Sept. 8, 1914 |
| 1,602,490 | Homan | Oct. 12 1926 |